Oct. 14, 1952 — H. D. DRAIN — 2,613,740
MITERING TOOL
Filed Aug. 13, 1947
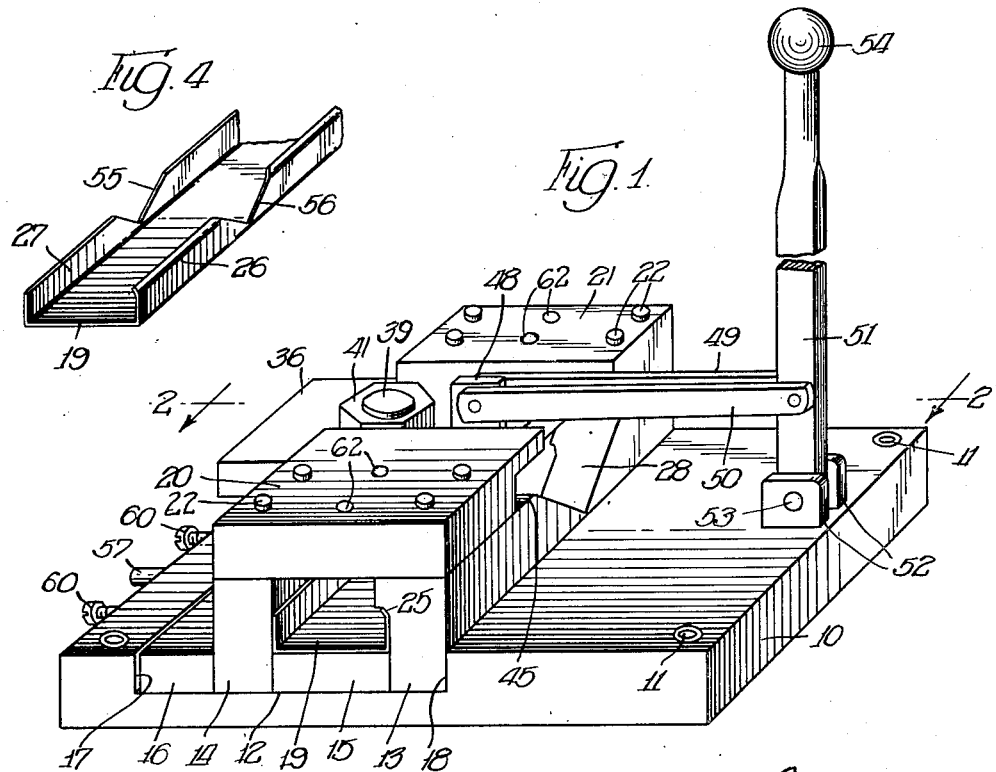
Fig. 4
Fig. 1
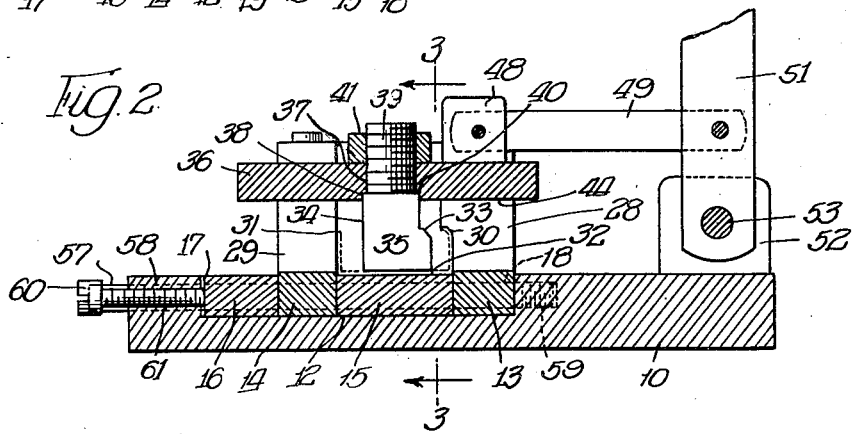
Fig. 2
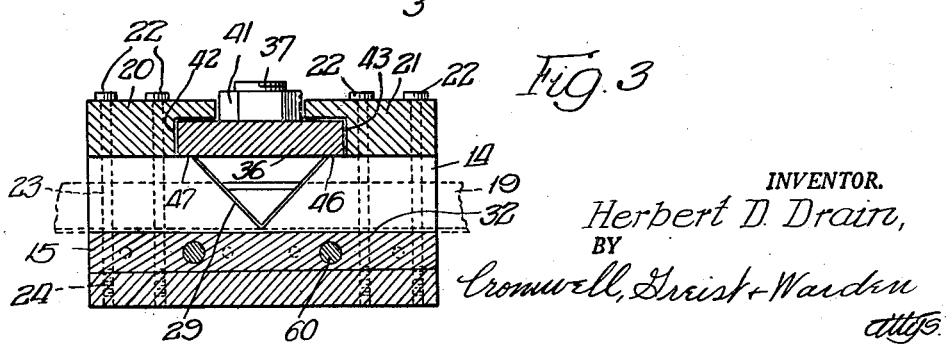
Fig. 3
INVENTOR.
Herbert D. Drain,
BY
Cromwell, Greist & Warden
Attys.

Patented Oct. 14, 1952

2,613,740

UNITED STATES PATENT OFFICE 2,613,740

MITERING TOOL

Herbert D. Drain, Chicago, Ill., assignor to Walter E. Selck and Co., Chicago, Ill., a corporation of Illinois Application August 13, 1947, Serial No. 768,349

2 Claims. (Cl. 164—50)

This invention is concerned with improvements in a hand operated tool for providing miter cuts in molding strip members.

It is an object of the invention to provide a hand operated device for cutting a triangular piece out of the side walls or flanges of a channel-like molding strip member to permit the member to be bent to form a right-angled corner.

It is another object of the invention to provide a manually operated device for making aligned mitering cuts in the top and bottom flanges of a channel-like strip of table edging or banding material.

It is another object of the invention to provide a device of the character described which is so constructed that it may be adjusted to cut moldings of different sizes and shapes.

It is a further object of the invention to provide a device for making mitering cuts in the flanges of metal moldings or trim members of the type provided for table edges, sink tops and the like, which device is simple, sturdy, readily operated and adapted to be inexpensively manufactured.

These and other objects of the invention will be apparent from a consideration of the preferred form of the device which is shown by way of illustration in the accompanying drawing, wherein:

Fig. 1 is a perspective view of a miter cutting tool embodying the principles of the invention;

Fig. 2 is a longitudinal section on the line 2—2 of Fig. 1;

Fig. 3 is a transverse section on the line 3—3 of Fig. 2; and

Fig. 4 is a perspective view of a section of a metal molding which has been cut with the mitering tool.

In the installation of edgings or moldings on tables or the like where a plate-like channel-shaped section of extruded or shaped metal or similar material is secured to the table edge with its flanges extending laterally of the table above and beneath the same, it is desirable to be able to bend the metal edging or molding at the corners to provide, along the edge of the table, a smooth exterior surface free of any rough edges. In order to bend the edging at the corners a triangular section of the material is removed from the top and bottom flanges which results in the formation of a mitered joint after the bending operation.

Referring to the drawings, there is illustrated a hand operated tool for cutting the triangular section of material from the flanges of the molding to permit the formation of the desired joint at the corners. The cutting tool comprises a base member 10 having corner holes 11 to accommodate bolts or similar fastening members for anchoring the base 10 to a workbench top or similar support. The base 10 is provided with a transverse recess or groove 12 which is of substantial width and which is located towards the forward side thereof.

A pair of relatively fixed vertically extending plate-like cutting dies or members 13 and 14 are positioned in the recess 12. The cutting dies 13 and 14 are separated by a spacer plate or block 15. A filler plate or block 16 is positioned between the outer die member 14 and the forward side wall forming surface 17 of the groove 12. The inner die member 13 is positioned with the lower portion of its rear face in abutting engagement with the inner side wall forming surface 18 of the recess 12. The die members 13 and 14 are separated by the spacer block 15 a distance equal to the width or depth of the molding section 19 (Fig. 4) which it is desired to cut.

The die members 13 and 14 are tied together at their top edge surfaces by plate members 20 and 21 which are secured by a series of stud bolts 22. The stud bolts 22 preferably extend through holes 23 in the die members 13 and 14 and have their ends in threaded engagement in holes 24 in the base member 10. When the bolts 22 are drawn tight the cutting dies 13 and 14 and the plates 20 and 21 are rigidly secured to the base 10.

The die member 13 is shaped on its forward face to conform at 25 to the shape of the bottom flange 26 of the molding 19. The die member 14 is provided with a plain rear face conforming to the plane surface of the top flange 27 of the molding 19.

Transverse triangular shaped grooves 28 and 29, intermediate the ends of the die members 13 and 14, provide cutting edges 30 and 31, respectively. The grooves 28 and 29 are in alignment transversely and extend downwardly from the top edge of the members 13 and 14 so that the apex of each groove is above the top surface 32 of the spacer plate 15 a distance approximately equal to the thickness of the material in the molding 19. The cutting edges 30 and 31 cooperate with complementary cutting edges 33 and 34 on member 35 which is suspended from a transversely movable plate member 36.

The movable plate member 36 is provided with a central aperture 37 having an enlarged recess forming portion 38 adjacent the bottom surface thereof. The cutter member 35 is provided with a reduced portion or stem 39 and an abutment shoulder forming portion 40. The shoulder portion 40 is adapted to be seated in the recess 38 in the plate 36. The stem 39 is threaded on its end to receive a clamping nut 41 which secures the member 35 in rigid position on the plate 36. The plate 36 is mounted to reciprocate in a guideway formed by recesses 42 and 43 provided in the inner edges of the blocks 20 and 21, respectively. The recesses 42 and 43 are positioned in parallel opposed relation above the top edges of the grooves 28 and 29 in the members 13 and 14, respectively. The plate sides on shoulder portions 44 and 45 provided on the top edge of member 13 adjacent groove 28 and shoulder portions 46 and 47 provided on the top edge of member 14 adjacent groove 29. The plate 36 is provided with an upstanding lug 48 adjacent its rear edge. A pair of links 49 and 50 are pivoted at one end to the lug 48 and at the other end to a generally vertically positioned handle member 51 intermediate the ends of the same. The lower end of the handle member 51 is pivoted between a pair of spaced lugs 52 on a pin 53. The top of the handle 51 may be provided with a spherical grip 54. The movement of the handle 51 about the pin 53 is transmitted through the links 49, 50 to the plate 36 to reciprocate the cutting member 35. Forward movement of the tool 35 cuts a generally V-shaped miter groove 55 in the wall 27 of the molding 19 while rearward movements cuts a similar groove 56 in the wall 26 of the same.

The cutting dies 13 and 14 and the spacer blocks 15 and 16 are held in proper aligned position in the groove 12 by means such as guide rods 57 which extend through apertures 58 in the forward portion of the base 10 and have their inner ends in threaded engagement in the apertures 59 in the rear portion of the base 10. Set screws 60 are provided in the forward portion of the base 10 and extend through threaded apertures 61 into engagement with the forward edge of the spacer block 16. By taking up on the screws 60 the members 13, 14, 15 and 16 are clamped in proper alignment in the recess 12.

The top tie members 20 and 21 are preferably provided with a plurality of aligned apertures 62 to permit adjustment of the cutting member 14 of the device for accommodating the metal sections of different widths. Cooperating threaded apertures are, of course, provided in the base 10 for each set of apertures provided in the top plates 20 and 21. Spacer blocks 15 of appropriate size are provided for use with the device when the cutting member 14 is adjusted to different positions.

While specific details of construction and materials have been referred to in describing the illustrated form of the device, it will be understood that other details of construction and other materials may be resorted to within the spirit of the invention.

I claim:
1. A cutting tool for miter cutting a channel-shaped molding, comprising a base member having an upwardly opening transverse groove, elongate upstanding parallel cutting members mounted lengthwise and in laterally spaced relation in said groove, said cutting members being separated by a spacer block of substantially the same width as the molding to be cut, clamping means for securing said cutting members and said spacer block in rigid position in said groove, guide means extending transversely above said cutting members, and a reciprocable cutting member of less length than the width of said spacer block mounted in said guide means, said upstanding cutting members having upwardly opening transverse V-shaped grooves providing spaced opposed cutting edges aligned with said guide means and reciprocable cutting member having cutting edges at the opposite ends thereof cooperating with said opposed cutting edges on said cutting members.

2. A device for making miter cuts in a molding which is characterized by an upstanding longitudinal flange, a base, a pair of elongate cutting bars, means to adjustably mount said cutting bars in upstanding parallel laterally spaced relation on said base, said bars being adapted to be spaced a distance slightly greater than the width of the molding to be cut, said bars having upwardly opening V-shaped grooves providing cutting edges on the inner surfaces thereof in laterally spaced aligned relation, guideway forming members extending laterally across said cutting bars above said grooves, a cutter member having cutting edges at the opposite ends thereof mounted for reciprocable movement in said guideway, said cutter member being of less length than the space between said cutting bars and means for reciprocating said cutter member to position said cutting edges for cooperation with the opposed cutting edges of the V-shaped grooves in the respective cutting bars to cut the flange of a molding placed therebetween.

HERBERT D. DRAIN.

REFERENCES CITED

The following references are of record in the file of this patent:

UNITED STATES PATENTS

| Number | Name | Date |
|---|---|---|
| 516,737 | Hammond | Mar. 20, 1894 |
| 1,241,728 | Grandchamp | Oct. 2, 1917 |
| 1,513,100 | Frederick | Oct. 28, 1924 |
| 1,679,572 | Hayden | Aug. 7, 1928 |
| 1,759,025 | Sutherland et al. | May 20, 1930 |
| 1,958,537 | Glass | May 15, 1934 |

FOREIGN PATENTS

| Number | Country | Date |
|---|---|---|
| 5,805 | Great Britain | of 1888 |
| 4,344 | Great Britain | of 1891 |